United States Patent
Zhou et al.

(10) Patent No.: US 7,987,885 B2
(45) Date of Patent: Aug. 2, 2011

(54) SYSTEM AND DIE FOR FORMING A CONTINUOUS FILAMENT REINFORCED STRUCTURAL PLASTIC PROFILE BY PULTRUSION/COEXTRUSION

(75) Inventors: Xixian Zhou, Collegeville, PA (US);
Gregory F. Jacobs, Oreland, PA (US);
Eric S. Waters, Gasport, NY (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 314 days.

(21) Appl. No.: 11/291,208

(22) Filed: Dec. 1, 2005

(65) Prior Publication Data
US 2007/0125301 A1    Jun. 7, 2007

(51) Int. Cl.
*B29C 70/52*    (2006.01)
(52) U.S. Cl. ...... 156/433; 156/500; 425/114; 425/379.1
(58) Field of Classification Search .................. 156/166, 156/180, 181, 433, 441, 500; 264/275, 277; 425/113, 114, 131.1, 133.1, 379.1
See application file for complete search history.

(56) References Cited

U.S. PATENT DOCUMENTS

| | | | |
|---|---|---|---|
| 2,313,569 A | | 3/1943 | Munthesen |
| 2,741,294 A | * | 4/1956 | Pancherz ...................... 156/180 |
| 3,051,995 A | | 9/1962 | Ferrell et al. |
| 3,091,547 A | | 5/1963 | Jones |
| 3,210,446 A | | 10/1965 | Yamakawa et al. |
| 3,529,050 A | * | 9/1970 | Smith .......................... 264/137 |
| 3,581,343 A | * | 6/1971 | Henrikson et al. ............. 156/501 |
| 3,737,352 A | * | 6/1973 | Avis et al. ..................... 156/181 |
| 3,773,449 A | * | 11/1973 | Hager .......................... 425/114 |
| 3,776,670 A | * | 12/1973 | Antioletti et al. ............. 425/114 |
| 3,895,896 A | * | 7/1975 | White et al. .................... 425/93 |
| 3,933,960 A | * | 1/1976 | Cameron et al. .............. 264/108 |
| 4,127,370 A | * | 11/1978 | Jackson .......................... 425/71 |
| 4,409,154 A | * | 10/1983 | Grenat ......................... 264/1.28 |
| 4,762,751 A | | 8/1988 | Girgis et al. |

(Continued)

FOREIGN PATENT DOCUMENTS

EP    0315451 A2    10/1989

(Continued)

OTHER PUBLICATIONS

JP07178828 Abstract and Machine Translation. Date Unknown.*

(Continued)

*Primary Examiner* — Michael A Tolin
(74) *Attorney, Agent, or Firm* — Abel Law Group, LLP; Chi Suk Kim

(57) ABSTRACT

A system and method are disclosed for producing a continuous filament reinforced thermoplastic profile having consistent cross section. A continuous reinforcing filament is pre-wetted with a first thermoplastic resin and introduced into a die, where it is contacted with a second thermoplastic resin extruded from an extruder at melt state. The temperature of the die is carefully controlled so that the pre-wetted filament and first resin do not cure or solidify until after they have contacted and mixed with the second thermoplastic resin. The mixture temperature is then controlled to make a substantially solidified profile pre-shape. A capping layer comprising a third thermoplastic resin is then coextruded onto the outer surface of the pre-shape. A multistage die for bringing together the filament and thermoplastic resins and for maintaining appropriate temperatures at each stage of the profile-forming process is also disclosed.

20 Claims, 10 Drawing Sheets

U.S. PATENT DOCUMENTS

| | | | |
|---|---|---|---|
| 4,812,343 A | | 3/1989 | Kiekhaefer et al. |
| 4,976,906 A | * | 12/1990 | Nakasone et al. ............ 264/139 |
| 5,076,777 A | * | 12/1991 | Schmitt ...................... 425/133.5 |
| 5,079,281 A | | 1/1992 | Takeuchi et al. |
| 5,084,222 A | | 1/1992 | Glemet et al. |
| 5,096,645 A | * | 3/1992 | Fink .............................. 264/137 |
| 5,110,275 A | | 5/1992 | Scheuring |
| 5,238,633 A | * | 8/1993 | Jameson .................. 264/211.23 |
| 5,318,737 A | | 6/1994 | Trabert et al. |
| 5,376,701 A | | 12/1994 | Chow et al. |
| 5,409,763 A | | 4/1995 | Serizawa et al. |
| 5,492,583 A | * | 2/1996 | Fingerson et al. ............ 156/180 |
| 5,540,797 A | | 7/1996 | Wilson |
| 5,679,157 A | | 10/1997 | Milliman |
| 5,792,529 A | | 8/1998 | May |
| 5,879,602 A | | 3/1999 | Scheuring |
| 5,961,684 A | | 10/1999 | Moireau et al. |
| 6,041,486 A | | 3/2000 | Forbis |
| 6,090,319 A | | 7/2000 | Sharma et al. |
| 6,197,412 B1 | | 3/2001 | Jambois |
| 6,264,746 B1 | | 7/2001 | Peng |
| 6,419,864 B1 | | 7/2002 | Scheuring et al. |
| 6,482,515 B1 | | 11/2002 | Berndt et al. |
| 6,533,882 B1 | | 3/2003 | Woodside |
| 6,579,605 B2 | * | 6/2003 | Zehner ........................ 428/319.9 |
| 6,659,020 B1 | | 12/2003 | Ball |
| 6,800,164 B2 | * | 10/2004 | Brandstrom .................. 156/166 |
| 6,955,735 B2 | | 10/2005 | Kusek |
| 2003/0015279 A1 | | 1/2003 | Kusek |
| 2003/0096096 A1 | | 5/2003 | Jo et al. |
| 2004/0001941 A1 | | 1/2004 | Kusek |
| 2004/0009338 A1 | | 1/2004 | Jo et al. |
| 2004/0080071 A1 | | 4/2004 | Jo et al. |
| 2004/0081814 A1 | | 4/2004 | Jo et al. |
| 2006/0029775 A1 | | 2/2006 | MacKinnon et al. |
| 2007/0092701 A1 | | 4/2007 | Jeng |
| 2007/0126142 A1 | | 6/2007 | Zhou et al. |

FOREIGN PATENT DOCUMENTS

| | | | |
|---|---|---|---|
| GB | 2313569 A | | 12/1997 |
| JP | 07178828 A | * | 7/1995 |

OTHER PUBLICATIONS

International Search Report for International Application PCT/US06/6161, Oct. 2007.

Written Opinion of the International Searching Authority, Oct. 2007.

* cited by examiner

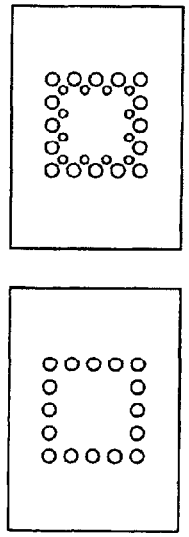
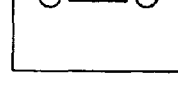
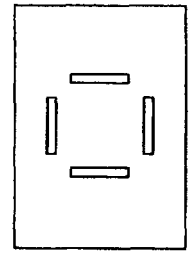
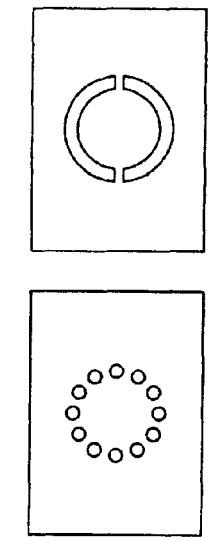
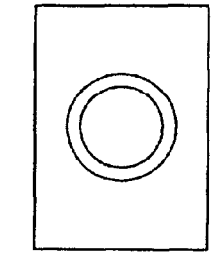
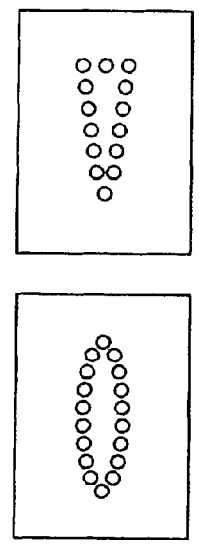

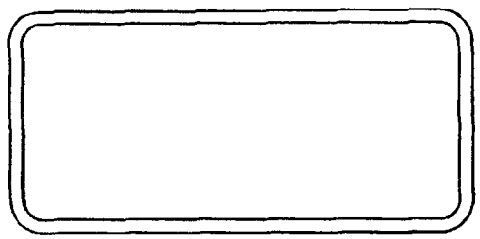
*Fig. 7A*
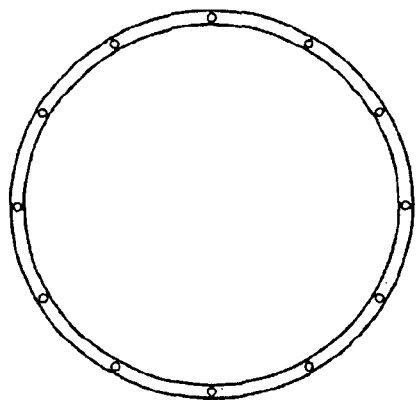
*Fig. 7D*
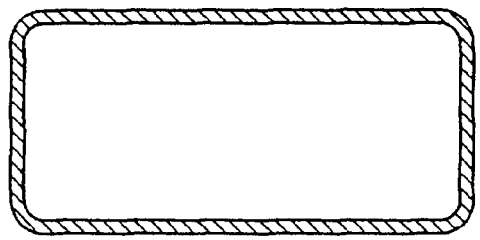
*Fig. 7B*
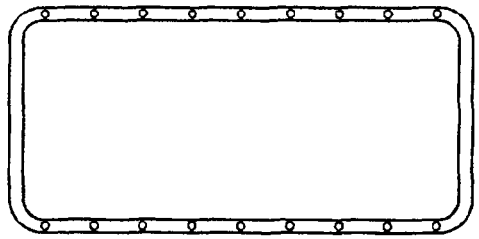
*Fig. 7C*
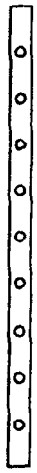 
*Fig. 7E*   *Fig. 7F*

SYSTEM AND DIE FOR FORMING A CONTINUOUS FILAMENT REINFORCED STRUCTURAL PLASTIC PROFILE BY PULTRUSION/COEXTRUSION

FIELD OF THE INVENTION

The invention relates to reinforced plastic composite materials and methods for their manufacture, and more particularly to improved continuous filament reinforced thermoplastic products and methods for their manufacture.

BACKGROUND OF THE INVENTION

Current residential and commercial fence and rail materials are made of traditional lumber, metal or polymers including thermoplastics. Typical thermoplastics used in these applications are PVC (polyvinyl chloride) and polyolefins such as polyethylene and polypropylene. Thermoplastics typically do not have the strength and rigidity of wood and lumber and, therefore, the rail for the fence and railing needs a steel or aluminum reinforcement channel inside the rail. Metal fence and rail materials, as well as the metal reinforcements used with current PVC fence and rail materials, are prone to corrosion attack, and lose strength in long-term endurance tests. Additionally, where dark-colored thermoplastics materials are employed, thermal expansion problems can arise due to differences in expansion between opposing sides of the product when the product is exposed to sunlight. Since the dark color absorbs heat more readily on the sun-facing side of the product, the resultant uneven heat buildup causes the rail to deform. An additional problem is the lack of long-term stiffness of polymeric products, which has limited the rail span between the posts to lengths less than traditional lumber and metallic rails.

One solution to the stiffness problem is to add filaments to the thermoplastic resin during manufacturing. These filaments typically are added as small-length (e.g., less than ½-inch long) chopped filaments made of any of a variety of materials. The resulting thermoplastic profiles can have increased strength and stiffness as compared to un-reinforced profile products. Typically, the short-filament reinforcement is achieved using extrusion techniques. Alternatively, continuous or long filament reinforcement of thermosetting and thermoplastic profiles has been achieved using pultrusion processes.

Conventional continuous filament reinforced thermoplastic profile products produced using conventional pultrusion processes still suffer from deficiencies in mechanical properties in the cross direction (e.g., flexural strength, tensile strength, impact strength, and compression strength), due typically to poor bonding between the substrate resin and the filaments. This poor bonding is primarily due to poor resin wet-out of the filaments by the resin. Thus, for applications using mechanical fasteners, the profile products have low screw and nail holding power. Additionally, cracking, splitting and separation of filaments in these profiles can easily occur during transportation, application, and installation.

As a result, in order to achieve desired high mechanical strength levels, filament reinforced thermoplastics profiles produced using conventional pultrusion processes, are designed to have thicker walls, and/or higher glass filament loading. Both of these approaches may result in a higher than desirable profile weight.

Additionally, conventional pultrusion processes for incorporating long filaments are relatively slow, and thus result in an undesirably low output rate (e.g., frequently on the order of only 2-3 feet per minute). The slowness of the process is due to the time required for (1) melting of the thermoplastics, and (2) wet-out of the melted thermoplastics around the filaments. Filament wet-out with thermoplastic resin is typically poor, even at higher temperature and longer residence times, due to the relatively high viscosity of thermoplastic materials. Further, incompatibility between the thermoplastic resin and the filament material can also lead to poor wet-out.

Thus, to achieve a desired total production rate with current pultrusion processes, additional machines must be employed. The additional machines, however, take up additional manufacturing floor space and involve larger amounts of capital investment, thus leading to increased costs.

Alternatively, conventional filament reinforced thermoplastic profile products produced using conventional extrusion processes suffer from deficiencies in mechanical properties in the cross direction because current processes only allow for the incorporation of very short filament lengths. This is because conventional extrusion of long filament reinforced thermoplastic profile products typically involves the use of an intermeshing twin screw extruder, whose intermeshing screws act like scissors which chop the filaments to short lengths, regardless of the length of the filaments added to the resin. Such processes can result in filament lengths of about one tenth of their originally added length. Where discrete-length filaments (in lieu of continuous filaments) are introduced into the extrusion flow, original filament lengths are limited to about ½-inch or shorter in length. If the filament length is too long (i.e., over ½-inch), the filaments will form a bridge at the introduction hopper, clogging the hopper and inhibiting feeding of the filaments into the extruder. Where filaments of less than ½-inch in length are used, the intermeshing twin screws can chop the filaments to even shorter length. Such short filament lengths are undesirable for use as reinforcement for thermoplastic products because they do not provide the enhanced strength that is desired. Additionally, filament loading using such processes is low.

Thus, there is a need for high strength thermoplastics products which incorporate a long or continuous filament reinforcement scheme. There is also a need for a process for producing such products in a fast and economical manner so as to make high-strength reinforced products commercially viable.

SUMMARY OF THE INVENTION

A system for providing a reinforced thermoplastic structure is disclosed. The system may comprise a resin wetting element for applying a first thermoplastic resin to an external surface of a plurality of reinforcing filaments. A die may be provided having (i) a first portion comprising a filament alignment channel for receiving the reinforcing filaments, (ii) a second portion for receiving a second resin, contacting the second resin with the reinforcing filaments, and at least partially solidifying the first and second resins to form a reinforced thermoplastic structure having a predetermined outer shape; and (iii) a third portion for applying a third thermoplastic resin to an exterior surface of said reinforced thermoplastic structure. The filament alignment channel may be sized to allow forward movement the filaments and the first thermoplastic resin to pass into second portion of the die and to prevent reverse movement of the first thermoplastic resin and the second thermoplastic resin backwards through the filament channel. The second portion of the die may have an angled resin inlet for receiving the second resin at a resin input angle that is non-orthogonal to a longitudinal axis of the filament.

A multistage die is disclosed for forming a reinforced thermoplastic structure. The die may comprise a first stage comprising a plurality of filament receiving channels for receiving a plurality of reinforcing filaments pre-wetted with a first thermoplastic resin and directing the pre-wetted filaments into a second stage of the die along a process direction. The second stage may comprise a filament receiving portion and a resin inlet for receiving a second thermoplastic resin at melt state, said resin inlet having an inlet angle that is non-orthogonal to the process direction; the second stage further having a curved flow channel to effect a smooth change in direction of movement of the second thermoplastic resin from an inlet direction to the process direction. The die may comprise a third stage comprising a capping resin inlet for receiving a third thermoplastic resin at melt stage. The curved flow channel of the second stage may cause the incoming second thermoplastic resin to contact the reinforcing filaments and the first resin to form a reinforced composite material.

A system for providing a reinforced thermoplastic structure is disclosed, comprising a resin wetting portion for applying a first thermoplastic resin to an external surface of a plurality of reinforcing filaments. The system may further comprise a die having (i) a first portion comprising a filament alignment channel for receiving the reinforcing filaments, (ii) a second portion for receiving a second resin, contacting the second resin with the reinforcing filaments, and at least partially solidifying the first and second resins to form a reinforced thermoplastic structure having a predetermined outer shape; and (iii) a third portion for applying a third thermoplastic resin to an exterior surface of said reinforced thermoplastic structure. The filament alignment channel may be sized to allow forward movement the filaments and the first thermoplastic resin to pass into the second portion of the die and to prevent reverse movement of the first thermoplastic resin and the second thermoplastic resin backwards through the filament channel. The second portion of the die may have an angled resin inlet for receiving the second resin at a resin input angle that is non-orthogonal to a longitudinal axis of the filament. The second portion of the die may further have a curved flow channel for guiding the second thermoplastic resin within the die to contact the reinforcing filaments and the first thermoplastic resin, and wherein the distal ends of the plurality of filament alignment channels are positioned adjacent to the curved flow channel.

BRIEF DESCRIPTION OF THE DRAWINGS

The accompanying drawings illustrate preferred embodiments of the invention, as well as other information pertinent to the disclosure, in which:

FIGS. 6A through 6K are end views of a variety of optional arrangements for filament channels in the die of FIG. 5;

FIGS. 7A through 7F are cross section views of a plurality of filament reinforced profiles produced in accordance with the process of FIGS. 1 and 2;

DETAILED DESCRIPTION

Figure 1:
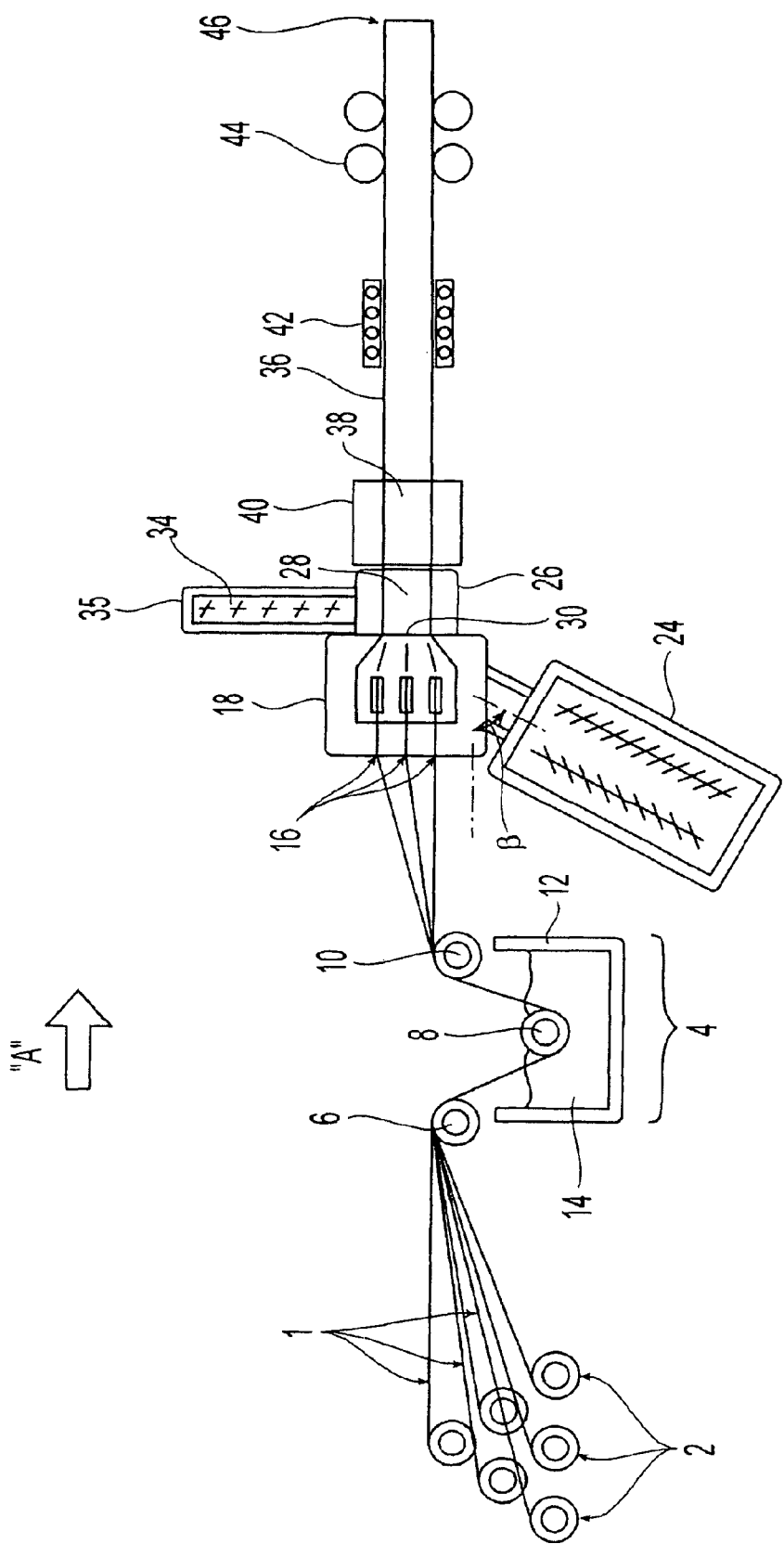
FIG. 1 is a schematic view of a first exemplary pultrusion-coextrusion system according to the invention.

Provided herein are a system and method for manufacturing continuous-filament reinforced thermoplastics profiles for use in residential and commercial building applications. For the purposes of this application the term "profile" shall mean structural members such as I-beams, planks, beams, columns, channels, such as, for example, C-channels, J-channels, F-channels, and the like, angles, and tubular shapes, window lineals, decking planks, railings, balusters, roofing tiles, siding, trim boards, soffiting, pipe, and the like, without limitation. Additionally, the term "filaments" shall mean individual filaments or fibers, or bundles of such filaments or fibers, such as roving, yarn, and rolls of mat, tape, felt or scrim. With reference to the Figures, and more particularly to FIGS. 1, 2A and 2B, an exemplary process for manufacturing a filament-reinforced thermoplastic profile is shown. A plurality of filaments 1 may be unwound from a plurality of creels 2 and passed through a filament wetting system 4 comprising filament alignment mechanisms 6, 8, 10 and a first thermoplastic resin wetting basin 12 which may pre-wet the filaments 1 with a first thermoplastic resin 14. The pre-wetted filaments 1 may then be fed into individual filament channels 16 in crosshead die 18. The individual filament channels 16 may be arranged within the die 18 to achieve a specific placement of the reinforcing filaments within the ultimate profile product 38. The individual filament channels 16 may also serve generally to direct the wetted filaments 1 into a main portion of the crosshead die 18 so that they may be brought into contact with a second thermoplastic resin 22. The second resin 22 may be extruded at melt state into the die 18 via a first extruder 24, to form a laminate or sandwich of resin 14, 22 and filaments 1, and to fill the die interior with thermoplastic resin. The pre-wetted filaments 1 and the second thermoplastic resin 22 together may then be directed through a profile die 26 to form a profile preshape 28. This profile preshape 28 may approximate the shape of the final profile.

The temperature and flow conditions within the crosshead die 18 may be carefully controlled, as will be discussed in more detail later, to ensure adequate commingling of the pre-wetted filaments with the second thermoplastic resin 22, and also to provide a graduated solidification of the profile preshape 28 as it passes through the die 18. At or near the outlet 30 of the die 18, the profile preshape 28 may pass through a profile die 26, (which may be part of the cross-head die 18 or it may be a separate die), where a third resin 34 with additives may be co-extruded onto the outer surface of the profile preshape 28 to form a cap layer 36. The third resin 34 may be injected at melt state using a second extruder 35. After the cap layer 36 has been applied, the resulting capped profile 38 may then pass though a calibrator 40 for shaping and sizing to adjust and control the dimensions and surface texture of the extrudate, followed by a cooling section 42, a pulling section 44, and a cutting section 46 that may cut the capped profile to a predetermined length.

Although not shown, a fourth resin could be applied as a clear coating to provide ultraviolet (UV) reflectance, wear resistance, wood grain patterning, or other desired property. In one embodiment, this clear coating would allow the color of the cap layer to be seen through the coating. This clear coating could be applied in a subsequent coextrusion or extrusion coating step, or it could be spray applied or printed by contacting or noncontacting means. The fourth resin may be a thermoset resin, such as epoxy, polyesters, phenolic resin, or it may be a thermoplastic resin, including but not limited to, acrylic polymer or copolymers, such as acrylic acid polymer, methacrylic acid copolymers (PMA), methyl methacrylic acid copolymers (PMMA), ethyl acrylic acid copolymers (PEA), ethyl methacrylic acid copolymers (PEMA), butyl acrylic acid copolymers (PBA), butyl methacrylic acrylic acid copolymers (PBMA), and/or the mixture of above, polyvinyl acetate, polyvinyl alcohol, ethylene vinyl alcohol, fluorinated polymers and copolymers, polymers and copolymers of vinylidene fluoride, polyurethanes, maleic acid modified ethylene copolymers, maleic acid modified propylene copolymers and metal ionomer salts, and/or mixtures or blends thereof.

Alternatively, the third or fourth layers could be applied as disclosed in copending U.S. patent application Ser. No. 11/247,620 to Jeng, titled "Building Material Having a Fluorocarbon Based Capstock Layer and Process of Manufacturing Same with Less Dimensional Distortion," filed Oct. 11, 2005, the entirety of which is incorporated by reference herein. The third, fourth, or yet subsequent layers could each in turn comprise sublayers, the sublayers being directed toward enhancing the aesthetics of and contributing to the weatherability of the finished extrudate.

Figure 2B:
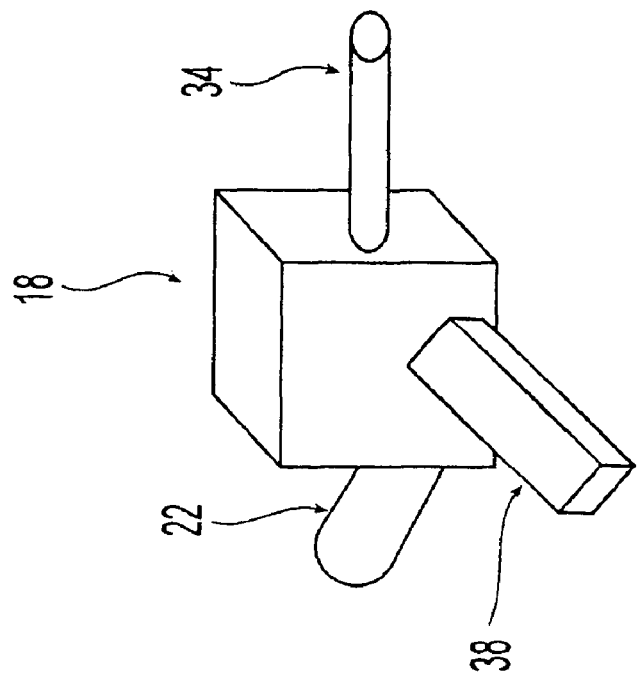
FIGS. 2A and 2B are front and reverse isometric views of a cross-head die for use in the system of FIG. 1, showing the introduction of reinforcing filaments and resins into the die, and the output of a structural profile from the die.
Figure 2A:
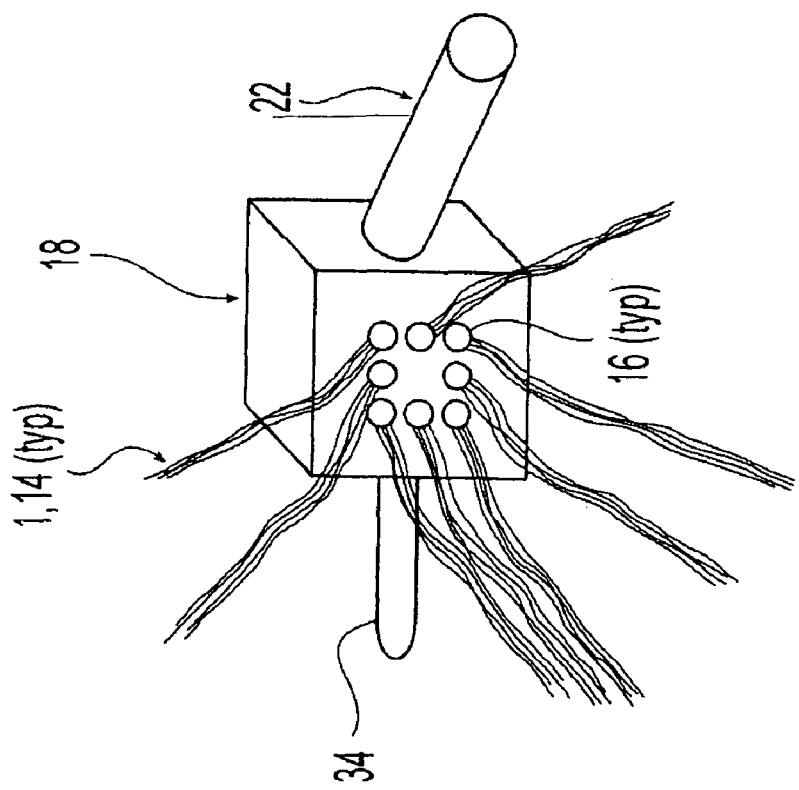

Additionally, although the process shown in FIG. 1 includes the application of a cap layer 36 to the profile pre-shape, the cap layer 36 is optional, such as where the substrate profile possesses appropriate properties for exterior or interior applications, such as resistance to environmental attack in the form of UV radiation, thermal impact, freeze and thaw cycles, rain storm, snow storm, hail, as well as resistance to chemicals such as acidic liquid or air, stains and the like. Thus, it is envisioned that a reinforced profile product may be formed without a cap layer 36.

Advantageously, the extrudate (the thermoplastic matrix comprising the second thermoplastic resin 22 and optionally the third thermoplastic resin 34) is not allowed to fully solidify within the die 18, and thus precise and accurate control of the final dimensions and surface texture of the profile 38 may be achieved by further processing downstream of the die 18. The solidification process for the thermoplastic matrix can be precisely controlled by carefully controlling the temperature within the die 18, thus ensuring that the profile 38 continues to be shapeable and formable as it is introduced into the calibrator 40, which controls the final shape of the profile. This solidification process is also advantageous because it prevents damage to the profile and/or the die, which could occur if the profile were to solidify fully within the die 18. For example, since the interior surface of the die 18 changes shape along the path of the extrudate (see FIG. 5A), full solidification of the profile within the die could cause the material to break, get stuck, or could cause the die to break.

The finished profile 38 may comprise a continuous filament-reinforced engineered structural thermoplastic profile having a consistent cross section, within which a plurality of reinforcing filaments are precisely located in order to maximize strength. The high strength of the finished profile 38 is attributable to the superior bonding between the pre-wetted continuous filaments 1 and the second thermoplastic resin 22. This high degree of bonding is achieved by selecting first and second thermoplastic resins 14, 22 having close chemical compatibility with each other, as well as with the cap (third) resin 34.

The individual portions of the system will now be discussed in greater detail.

Figure 3A:
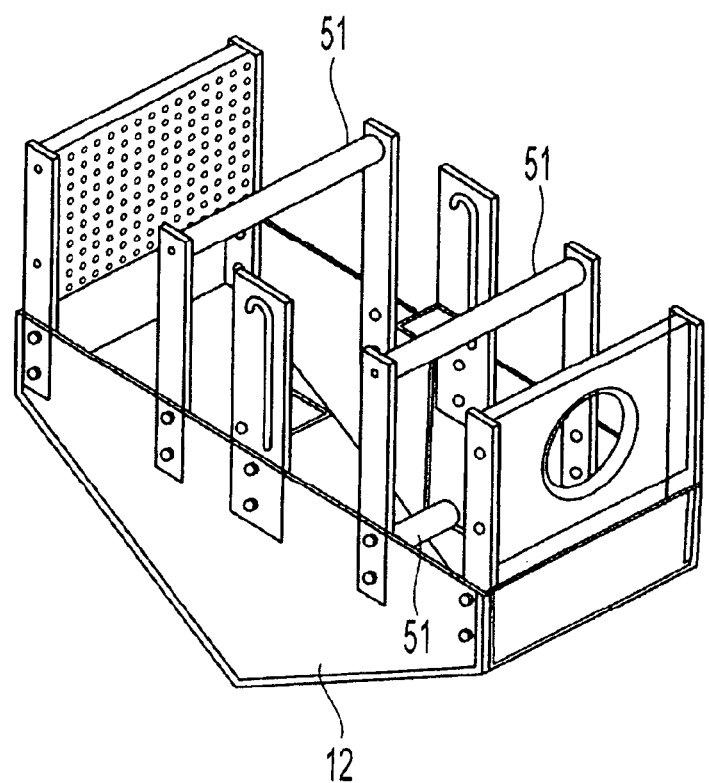
FIGS. 3A, B, C, D and E are isometric and cross section views of an exemplary filament wetting system for use with the system of FIG. 1.

The filament wetting system 4 may be arranged to provide a desired high degree of wetting of the filaments 1 with the first resin 14 prior to their introduction into the crosshead die 18. FIG. 3A shows a preferred arrangement for a filament pre-wetting system 4, including a resin wetting basin 12 and one or more filament alignment structures 51, which in FIG. 3A comprise bars. Alternatively, planar filament alignment structures commonly referred to as "holly boards" 52a, b, c (FIGS. 3B, 3C, 4A, 4B) may be used in place of the bars 51. Thus, as shown in FIG. 3C, the basin 12 may be filled with a quantity of substantially liquid first resin 14, and one or more holly boards 52 may be arranged in substantially vertical alignment with respect to the surface of the liquid first resin. The basin 12 is optionally equipped with temperature control means (not shown) as is the path of the fibers 1 from the creels 2 to the die system.

Again, referring to FIG. 3C, the holly boards 52 may advantageously be used to align the filaments 1 as they are unwound from the creels 2 and to direct the filaments below the surface of the first resin 14. As such, a first holly board 52a may be positioned so that all of the filaments 1 are above the level of the first resin 14, while the next holly board(s) 52B (or bar, or roller) may be positioned beneath the level of the first resin to ensure all of the filaments are submerged in the first resin. The third holly board 52c may again be positioned above the level of the first resin 14. As such, the filaments 1 may traverse a substantially V-shaped or U-shaped path through the resin basin 12. It is noted that a U-shaped path may result in the filaments 1 being submerged in the first resin 14 for a longer period of time than with a V-shaped path. Likewise, a W-shaped path (in which the filaments are moved into the bath, out of the bath, and then back into the bath) could achieve a similar effect.

In one embodiment, the filaments 1 are glass fibers, and the first resin 14 is a PVC plastisol. In another embodiment, the fibers are polymeric fibers. In yet another embodiment, the resin is a high melt index thermoplastic polymer, preferably a high melt index acid containing polyolefin copolymer in a molten state. Such acid containing olefin copolymers include, but are not limited to, acrylic polymer or copolymers such as methacrylic acid polymer, methyl methacrylic acid copolymers, ethylene methacrylic acid copolymers, ethylene acrylic acid copolymers, butyl acrylic acid copolymers, butyl methacrylic acid copolymers, maleic acid modified ethylene copolymers, maleic acid modified propylene copolymers and metal ionomer salts thereof.

Figure 3B:
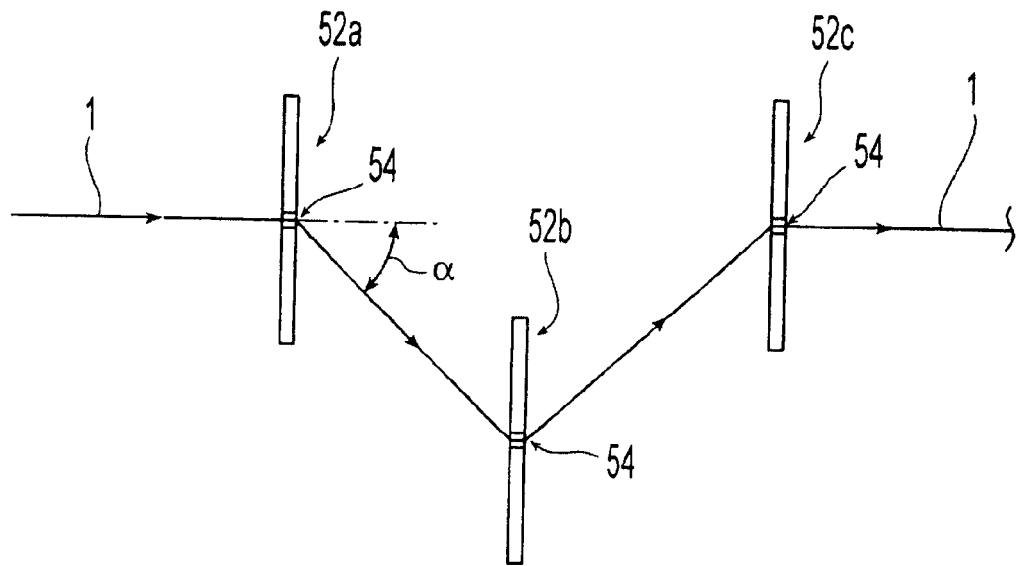
Figure 3C:
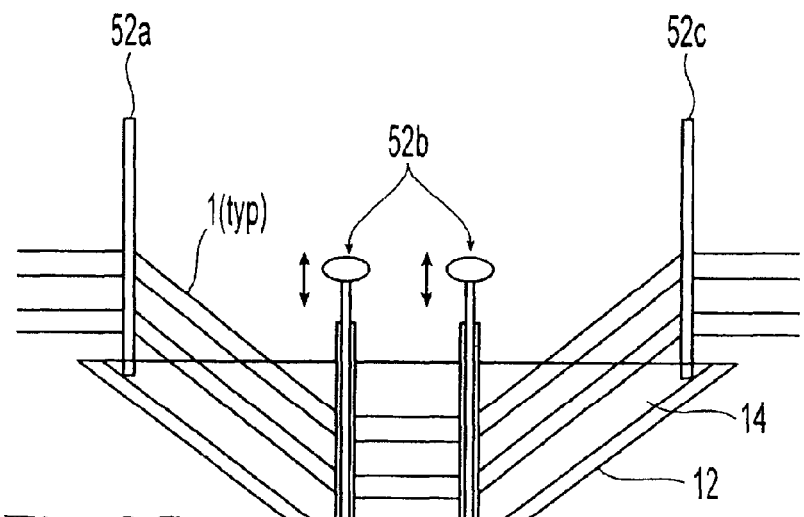
Figure 4A:
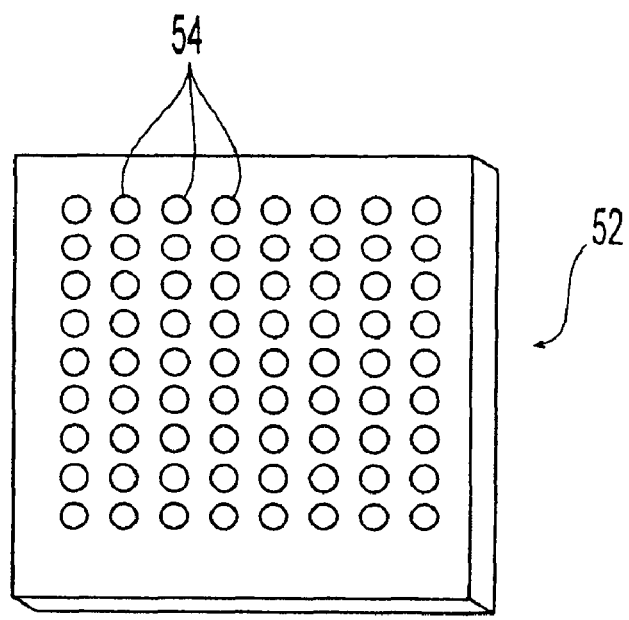
FIGS. 4A and 4B are exemplary filament alignment devices for use with the filament wetting system of FIGS. 3A and 3B.
Figure 4B:
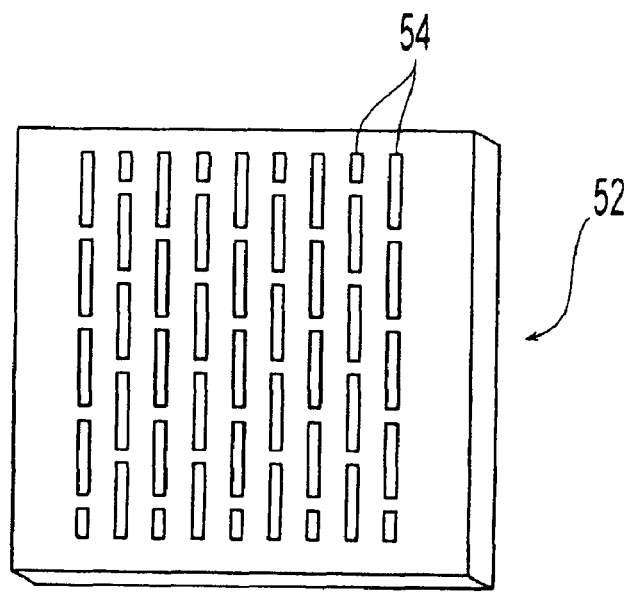

As shown in FIGS. 3B, 4A, B, the holly boards 52 may each have a plurality of openings 54 for receiving individual filaments 1 or bundles of filaments. These openings 54 may serve to align the filaments 1 and to prevent adjacent filaments from tangling with each other as they move from the creels 2 through the resin basin 12. The openings 54 may also control the total number filaments 1 that occupy a particular region of the resin basin to ensure that a maximum surface area of each filament is exposed to the liquid first resin 14 for a desired amount of time, to thereby achieve adequate wetting of a maximum number of filaments. The individual openings 54 in the third holly board 52c may be sized and shaped to squeeze excess resin from the surfaces of the filaments after the filaments have emerged from the first resin 14, and to return the excess resin to the basin 12 for reuse. The openings 54 in the holly boards 52 may be round (FIG. 4A), rectangular or slotted (FIG. 4B), square, elliptical, triangular, etc., or combinations thereof.

The arrangement of the holly boards 52 (i.e., their vertical and horizontal positions with respect to each other) may be configured so that, for a given line speed, the filaments 1 reside in contact with the first resin 14 for a sufficient time to provide a desired degree of wetting. The residence time of the filaments 1 in the first resin is preferably not less than 5 seconds, more preferably about 10 seconds, and most preferably about 20 seconds. Additionally, the angle α (FIG. 3B) between the longitudinal axes of the filaments 1 and the vertical planes of the individual holly boards 52 may be up to about 90-degrees, and preferably between about 0-degrees to about 50-degrees. Providing an angle α that approaches 0-degrees (i.e., a horizontal filament path) results in less friction and resistance to movement of the filaments 1 through the holly boards 52.

One or more holly boards 52 may be used with a single basin 12. Alternatively, roller or bar elements 51 (FIGS. 3A, 3D, 3E) may be used in place of one or more of the holly boards 52. In one embodiment, illustrated in FIG. 3C, where multiple holly boards are used in a single basin 12, the holly boards 52b may be slidably mounted to the basin 12 so that it may be moved up and down with respect to the level of the first resin 14 (in the direction of the arrows). This vertical adjustability may also be provided where rollers are used in lieu of holly boards (see FIG. 3D). Providing such adjustability may allow the user to control the amount of time the filaments 1 are in contact with the first resin (i.e., the residence time), thus allowing the user enhanced control over the filament wetting process. It will be appreciated that this adjustability feature may be automated so that the user can electronically control the positions of one or more of the holly boards, thus allowing automated control of the filament wetting process. For example, the level of the filaments 1 may be adjusted within the basin 12 to compensate for changes in the level of resin in the basin, thus ensuring adequate filament wetting. Additionally, providing adjustable holly boards allows easy control of the wetting process during startup and shutdown of the system.

Furthermore, the arrangement of the openings 54 in the holly boards 52 may be configured in specific geometric or other patterns to pre-align the filaments 1 in the same or similar arrangement to that of the filament channels 16 in the die 18 and/or the filament placement in the final profile pre-shape 28 as desired.

Figure 3D:
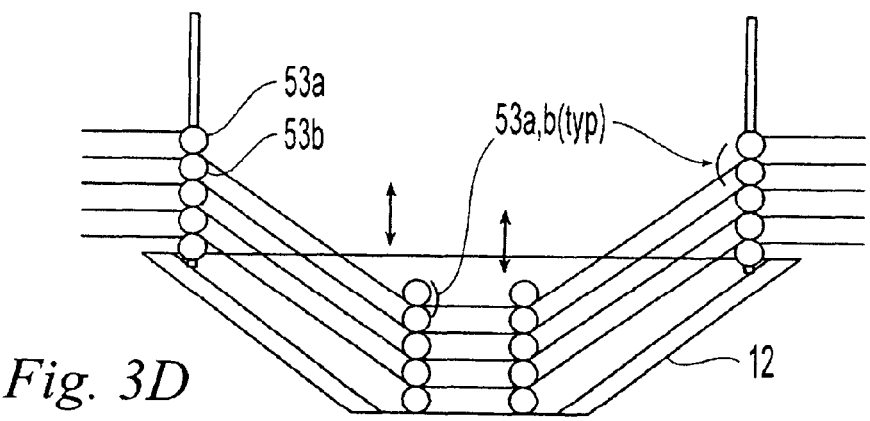
Figure 3E:
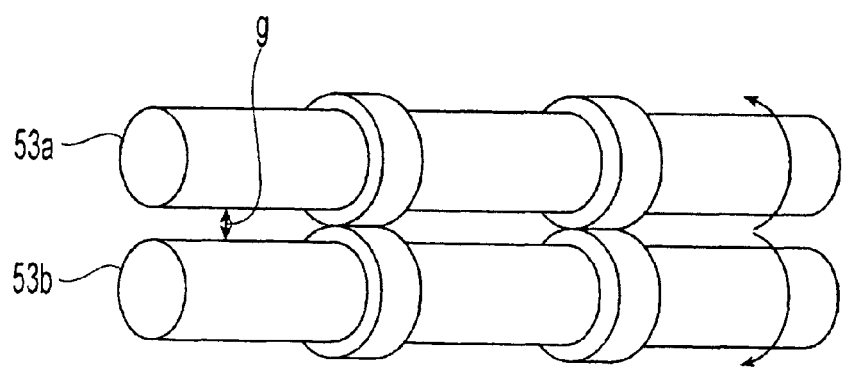

As previously noted, one or more of the bars 51 or holly boards 52 may be replaced by a suitable pair of opposing rollers 53a, b having a known gap "g" between them (see FIGS. 3D, 3E). The opposing rollers 53a, b may be used in a fashion similar to the holly boards 52 to direct the filaments 1 through the resin bath. Such an arrangement, while providing a degree of flexibility, may not provide the same control over filament alignment as is obtainable with the holly board arrangement. This may be important because it can reduce the ability of the system to prevent filaments from bunching or clumping when they contact the first resin 14, which can adversely affect the efficiency of the wetting procedure. The use of rollers may, however, be advantageous when feeding mat, scrim or reinforcing tapes through the basin 12. Additionally, the rollers may be provided with grooves on the roller surfaces to act as a guide for such flat reinforcing materials.

As an alternative to the use of a resin wetting basin 12 and holly board 52 or roller 53a, b arrangement, the filaments 1 could be pre-wetted by resin 14 by injecting the resin 14 adjacent the proximal ends 61 of the filament channels 16 prior to contacting the fibers with the resin 22 in the die 18 at the distal ends 62 of the channels 16. Alternatively, the first resin 14 could be applied via a spray-coating process.

The temperature of the first resin 14 in the basin 12 preferably will be lower than the gelation temperature of the first resin in order to ensure maximum wetting of the filaments by the resin. Thus, the resin temperature may be less than about 250-degrees Fahrenheit (F), more preferably less than 150-degrees F., and most preferably less than about 100 F. In the case where the resin is a polymer melt, the temperature should be hot enough to melt the resin and maintain it at a viscosity sufficiently low to enable wetting of the filaments, but cool enough to maintain thermal stability of the polymer melt.

An alternative filament wetting system is described in U.S. Pat. No. 6,955,735 to Walter W. Kusek, the entire disclosure of which is incorporated by reference herein.

Figure 5A:
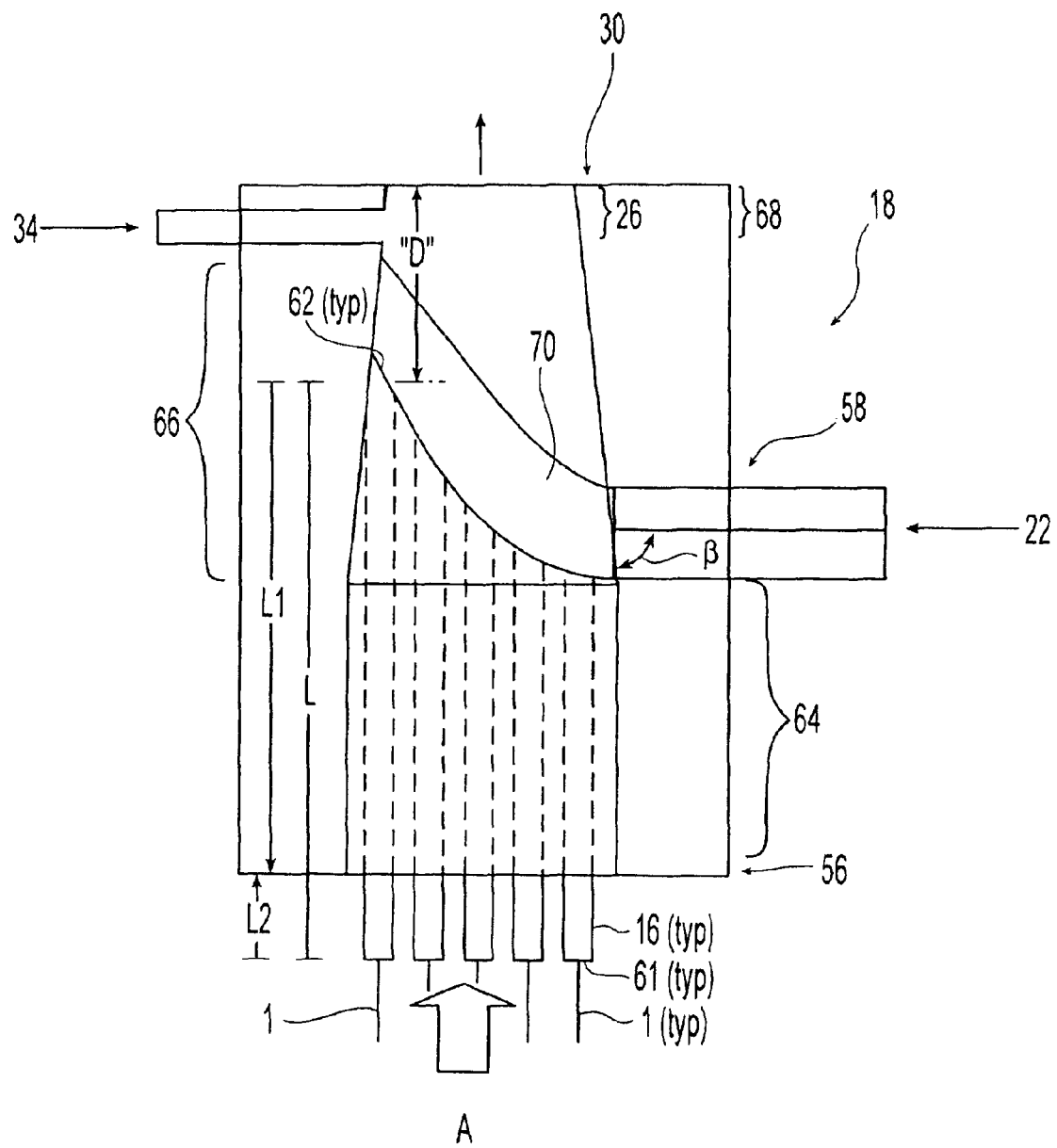
FIGS. 5A, B and C are a cross section views of an exemplary die for use with the pultrusion-co-extrusion process of FIG. 1.

Once the filaments 1 have been wetted with the first resin 14, they may pass into the crosshead die 18 for positioning, shaping and other processing. Referring to FIG. 5A, the crosshead die 18 has a filament inlet end 56, an intermediate extrusion inlet portion 58, and an outlet end 30. The filament inlet end 56 may comprise a plurality of filament channels 16 configured to receive one or more of the filaments 1 or bundles of filaments and to guide them into desired positions within the crosshead die 18. Thus, the filament channels 16 may act to place the individual filaments 1, or bundles of filaments, in the positions they will assume within the final thermoplastic profile 38. The filament channels 16 may each have a length L, and a first portion L1 of the length L of each of the channels 16 may extend axially within the crosshead die 18 so that the distal ends 62 of the channels 16 align with an inlet flow of the second resin 22. A second portion L2 of the length L of each of the channels 16 may project axially outside of the die 18 to allow for external cooling or other temperature control of the channels, which will be explained in more detail later. As can be seen from FIG. 5A, the filament channels 16 may be of different lengths L and they may extend different distances (L1) within the die 18.

Although it may be advantageous for the filament channels 16 to guide the filaments 1 deep into the die 18, it is also important that the channels 16 do not interfere with the intermixing of the filaments 1 and the second resin 22. Thus, in one embodiment, the distal ends 62 of the filament channels 16 may be spaced a distance D from the outlet end 30 of the die 18. This distance D should be sufficient to ensure adequate interaction between the second resin 22 and the pre-wetted filaments 1. As shown in FIG. 5A, the distance D may be a different value for each of the individual filament channels 16 (due to interaction with the curved flow channel 70). Preferably distance D will be about 0.5 inches to about 2-inches, more preferably about 1-inch to about 2-inches, and most preferably about 1.5-inches to about 2 inches. As will be appreciated, providing the appropriate distance D for each filament channel 16 is important to prevent a high pressure condition at the distal end 62 of the filament channels 16. Ideally, the difference between the force generated by the forward motion of the pre-wetted filaments 1 through the die 18 and the force generated by the injection of the second resin 22 should result in a backpressure of about zero at the distal ends 62 of the filament channels 16, to prevent backflow of the second resin 22 into the filament channels 16.

As shown in FIGS. 6A through 6K, the filament channels 16 may be provided in any of a variety of orientations and arrangements to result in a thermoplastic profile having a desired reinforcement scheme. Thus, square/rectangular (FIGS. 6A-D), cylindrical (FIGS. 6E-G), elliptical (FIG. 6H), triangular (FIG. 6I), and slotted (FIG. 6K), reinforcement configurations may be provided, depending upon the shape of the profile, and the type of reinforcement desired. The reinforcement can be applied around substantially the entire perimeter of the profile, or it may be applied only to specific locations that are advantageous according to a particular design. Examples of such placements in finished forms are shown in FIGS. 7A through 7F. A mandrel (not shown) may optionally be provided within the overall die structure to enable processing of hollow or shaped parts of desired geometry.

With reference again to FIGS. 5A-C, the different stages of crosshead die 18 will be described in greater detail with respect to the operation of the system. The die 18 of FIG. 5A has three individual "stages. The first stage 64 may be a filament/resin feeding stage in which pre-wetted filaments 1 are fed through the filament channels 16. The second stage 66 may be a "transition stage" in which the filament (wetted with the first resin 14) contacts the second resin 22 at the output of the first extruder 24. The third stage 68 may be a preforming/capping stage, in which the final profile preshape 28 is formed, the preshape being close to the desired final shape, and the extruded capstock layer 36 is applied. It is noted that this arrangement is slightly different from that illustrated in FIG. 1, in which the profile die 26 was shown a separate die attached to the outlet 30 of the crosshead die 18. In the arrangement of FIG. 5A, however, the profile die 26 is provided as an integral part of the crosshead die 18 (and thus the outlet 30 of the crosshead die is shown as being downstream of the profile die 26). Either arrangement may be used as appropriate.

Figure 5B:
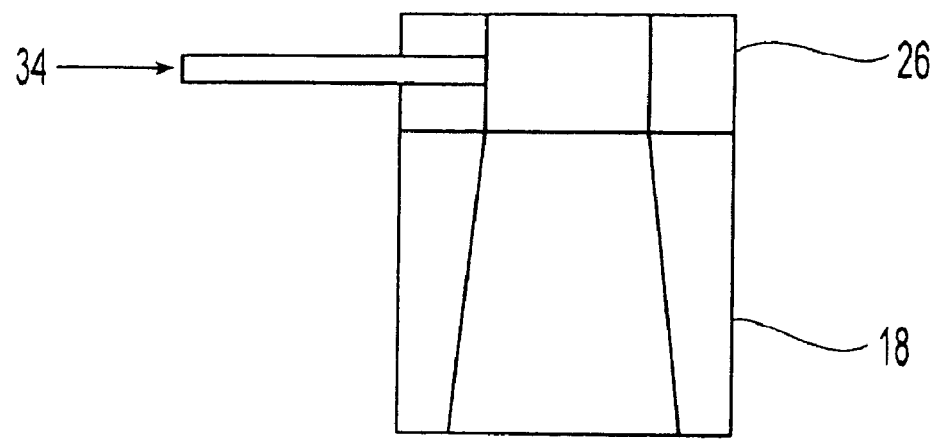
Figure 5C:
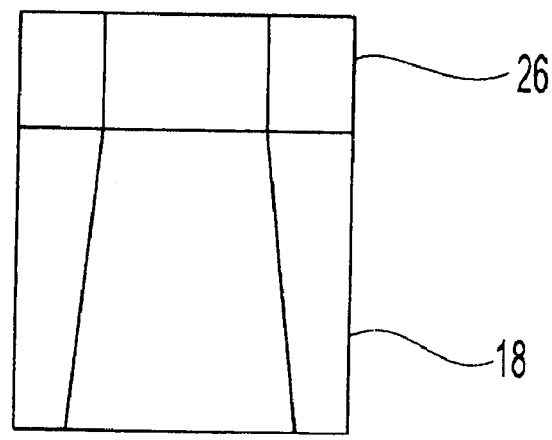

FIG. 5B shows the crosshead die 18 in which the third resin 34 is applied to the profile preshape 28 at the profile die 26. FIG. 5C shows an alternative arrangement in which there is no inlet for the application of the third resin 34, and thus the profile preshape 28 is shaped within the profile die without a capping layer. Thus, the arrangement of FIG. 5C may be used to manufacture an uncapped profile product.

In order to obtain a highly efficient process, the temperature of the die 18, and the materials contained therein, should be closely controlled to ensure that the transition from liquid resin to solid profile is achieved at the desired place or region within the die, and that the liquid resins (the first or second resins 14, 22) not gel (in the case of the first resin 14) or solidify too early or too late. It will be appreciated that although these stages are described as being discrete, they may rather comprise "zones" without discrete boundaries.

The second stage 66 of the die 18 may also have an internal channel 70 configured to smoothly move the second resin 22 into intimate contact with the filaments 1 and to move the combined resin/filament mixture smoothly toward the die outlet 30, without generating unacceptable back flow of resin into the filament channels 16. The internal surfaces of the crosshead die 18 may further be designed to minimize or eliminate internal static spots (also referred to as "dead spots") within the die which may cause resin degradation, filament hang-up, or filament breakage.

As previously noted, when the pre-wetted filament 1 is fed into the die 18 via the filament channels, each filament 1 (or filament bundle) may be received within its own channel 16. Preferably, the filaments 1 will remain inside their respective channels for as long as possible prior to interspersion of the filaments and the second resin. As previously noted, this may serve to accurately place the filaments at desired locations within the ultimate profile product. It also may serve to shield the individual filaments from the higher temperatures of the second stage 66 of the cross-head die 18 to ensure that the first resin 14 does not begin to gel before it contacts the second resin 22. This may be important because if the first resin 14 solidifies too early in the process, it can clog its associated filament channel 16. Additionally, early solidification can compromise the bond between the wetted filament 1 and the second resin 22, preventing intimate bonding between the first resin 14 and second resin 22 due to lack of thermochemical reactivity, thereby resulting in a profile having lower mechanical strength characteristics.

Referring again to FIGS. 1 and 2, the second resin 22 may be introduced into the crosshead die 18 at an extrusion inlet portion 56 of the die. The second resin 22 may be introduced into the die 18 at an input angle β, which in FIG. 5A is about 90-degrees with respect to the flow direction "A" of the filaments 1. More preferably, as shown in FIG. 1, the flow angle β may be less than 90-degrees so that the flow direction of the second resin has a flow component parallel to, and in the same direction as, the movement direction "A" of the filaments 1. In one preferred embodiment, the flow angle β is about 0-degrees to about 60-degrees; in a more preferred embodiment, the flow angle β is about 0-degrees to about 45-degrees; and even more preferably, the flow angle β is about 0-degrees to about 40-degrees. Providing a non-perpendicular flow angle is advantageous because it minimizes or overcomes backpressure in the filament channels 16 which may be caused by the high pressure flow of the second resin 22 into the die 18. As previously noted, such backpressure, if left unchecked, may lead to an undesirable backflow of resin through the filament channels 16. Yet another benefit to such an angled introduction arrangement for the second resin 22 is that it allows the associated first extruder 24 to be positioned closer to die 18, thus reducing the overall system floor-space.

Thus, orienting the flow of the second resin 22 so that a component of its flow aligns with the flow direction "A" of the filaments 1 may serve to reduce the potential for the previously described backflow by adding the forward momentum/movement of the second resin 22 through the die 18 to the forward movement of the filament/first resin 1, 14. As noted, an optimal balance may be obtained between the pressure at which the second resin 22 is introduced into the die and the flow angle β at which the second resin 22 is introduced. This balance may be the point (or range) at which the force of forward movement of the second resin 22 exactly overcomes the backpressure caused by the second extruder 35. At this balance point (or range), the resulting "pseudo-pressure" will approach zero. In one preferred embodiment, this resin input angle β may be about 30-degrees to about 45-degrees.

As a further measure against backflow of resin into the filament channels 16, the clearance between the inner surface of the filament channels 16 and the associated filament 1 should be small. It will be appreciated that the ultimate clearance required to minimize or eliminate such backflow may be dependent upon the pressures inside the die, as well as the viscosity and outer dimension of the filaments being introduced. Preferably, the clearance between the pre-wetted filaments 1 and their respective filament channels 16 will be as small as possible, preferably approaching zero. In one embodiment, an additional quantity of resin 14 could be injected into the channels 16 with the filaments to minimize backpressure at the point where the filament meets the resin 22 at the curved flow channel 70.

Further, the pressure at the distal ends 62 of the filament channels 16 should be maintained as low as practical, preferably less than about 100 pounds per square inch (psi), more preferably less than about 80 psi, and most preferably less than about 50 psi. These pressures may be roughly equivalent to the output pressure of the first extruder 24.

As previously noted, the die interior may have a curved flow channel 70 which is configured to gently direct the flow of the second thermoplastic resin 22 toward the die outlet 30. The degree and nature of the curvature of the flow channel 70 may selected based on the properties of the resin (e.g., viscosity, molecular weight, molecular weight distribution). Exemplary shapes may be parabolic, logarithmic, etc. to provide smooth flow of the second resin 22 and result in even wall thickness distribution for the profile preshape 28. As shown in FIG. 5A, the distal ends 62 of the filament channels 16 may each extend a different axial distance L1 within the crosshead die 18 so that the filaments 1 are introduced at the edge of the curved flow channel 70. Thus, when the second resin 22 is introduced into the die 18, its forward path may be urged gently forward by the contours of the flow channel 70 to assume a flow direction parallel to that of the movement direction A of the filaments 1 (FIG. 5A). The angled input orientation of the second resin 22, in combination with the curved flow channel 70, may also reduce the chance that static spots (dead spots) may form inside the die 18 which may cause resin degradation, or filament hang-up or breakage.

In order to obtain smooth operation of the system to obtain a desired profile shape having strong bonding between the individual resin and filament components, close control should be maintained over the temperatures of the first and second resins 14, 22 at the different stages of the crosshead die 18. In the first stage 64, the temperature of the filaments 1 (and importantly the first resin 14 which wets the filaments 1) should be maintained below the gelation temperature of the first resin 14 to prevent or minimize the chance of clogging of the filament channels 16. Preferably the temperature of the first stage 64 will be less than about 250-degrees F., more preferably about 150-degrees F., and most preferably less than about 100-degrees F. It is noted that these temperatures are exemplary, and assume that the first resin 14 comprises a vinyl plastisol resin. Where different resin compositions are used for the first resin 14, appropriate temperatures should be maintained in the first stage to maintain the first resin 14 in a substantially liquid phase as it moves with the filaments through the filament channels 16.

In the second stage 66, the pre-wetted filaments 1 are contacted by the second resin 22 and preferably the composite will begin to solidify slightly due to the initiation of a thermo-chemical reaction (caused by the second temperature) in the die between the first and second resins 14, 22 (and within the resins themselves). Thus, the second stage represents the initial formation of what will become the ultimate profile shape. The temperature of the second stage 66 should preferably be higher than that of the first stage 64. In one embodiment, the temperature of the second stage 66 should be about 300-degrees F. to about 450-degrees F., more preferably about 320-degrees F. to about 400-degrees F., and most preferably about 350-degrees F. to about 380-degrees F.

As previously noted, it is important to ensure that the temperature of the first stage 64 is not so high that the first resin begins to gel too early (i.e. within the filament channels or adjacent their distal ends), which may cause the tubes to become clogged. Such clogging may cause the process run less efficiently, or to be stopped entirely. Also, it may result in inefficient or incomplete bonding between the first and second resins, thus resulting in a profile having less than desired mechanical strength or other physical or aesthetic defect. Since the die 18 will typically be made of metal (in some embodiments), a relatively high rate of conduction heat transfer may be expected from the higher temperature second stage 66 to the lower temperature first stage 64. Although the total conduction may be relatively low when the system is initialized, heat transfer can be substantial once the system has been running for a significant period of time. To minimize this heat transfer, a suitable insulation layer may be provided between the first and second stages to provide a thermal barrier. Examples of appropriate insulation materials are polymer or polymer composites, ceramic materials, glass wool, and the like.

In lieu of (or in addition to) providing an insulating layer between the first and second stages 64, 66, a cooling apparatus may be provided adjacent the first stage 64 to draw heat away from the filaments and first resin 14 to maintain the temperature sufficiently low to maintain the resin 14 in a liquid state. Such cooling apparatus may comprise an air stream or air jet, a cooling jacket, an internal cooling channel, cooling fluid circulation channels, or the like. Use of an air stream may be particularly well suited for applications in which the proximal ends 61 of the filament channels 16 extend out from the inlet end 56 of the die 18, since cool air may be blown across the proximal ends 61 of the channels 16 to cool the contained filaments/resin. In one embodiment, the proximal ends 61 of the filament channels 16 may each extend about 2-inches to about 3-inches out from the input end 56 of the die 18 to allow cool air to be blown across the outer surface of the channels. In the case where resin 14 is a molten thermoplastic resin, it may be desirable to maintain the resin in a molten state as it enters the filament channels 16. Further it may be desirable to contain a molten resin in an inert environment, such as contained within a closed process path, or under an inert gas atmosphere.

The third stage 68 of the die 18 may constitute a preforming/capping stage, in which a final profile shape is "preformed" and where the capstock extrusion is applied to further approach a final dimension. As such, the third stage 68 may comprise a profile die 26 (or feed block) in which the composite is formed into a shape close to the final profile shape, and the capstock extrusion is applied. Thus, a second extruder 35 may be attached to the third stage 68 to co-extrude a third resin 34 on the profile preshape 28. Unlike the second resin 22, the third resin 34 is applied by an extruder or injector that can generate sufficient pressure to push the third resin 34 forward into the process path, and thus the concerns regarding backpressure within the die 18, etc. do not apply. As such, the second extruder 35 may be oriented to introduce the third resin 34 into the profile die/feed block 26 at any desired angle. As noted previously regarding the first extruder 24, orienting the second extruder 35 at an acute angle with respect to the profile die/feed block 26 may reduce the overall system footprint. As an alternative to the co-extrusion process, the third resin 34 may also be applied to the profile preshape 28 using an extrusion coating process.

It will be appreciated that known heating apparatus or apparatuses may be used to input heat to the second and third stages 66, 68 of the die 18 to within the desired temperature ranges.

The ultimate speed at which the profile 38 is drawn through the die 18 may be adjustable, and may be based on chemical composition of the first and second resins 14, 22, as well as size of the profile shape being produced. The inventors have achieved output rates of greater than nineteen (19) feet per minute using the disclosed system with vinyl plastisol and thermoplastic materials and method for a profile having a cross-sectional area of about 0.42 square inches. It is expected that even greater output rates may be achieved using the system, limited primarily by the curing time for the resins and the need to maintain the temperature above the curing temperature of the resins long enough to form the profile preshape at the desired location within the die.

Although not shown, the die 18 may be provided in either a single or multilayer arrangement. In one alternative embodiment in which a multilayer arrangement is used, the die may be configured so that the different die layers can be rotated with respect to each other (either in opposite directions or the same direction at different speeds) to generate angled filament reinforced profiles. As such, the resulting profile may have a first layer of filaments oriented substantially parallel to the flow direction "A," and a second layer of filaments oriented non-parallel to the flow direction, "A." Exemplary filament orientations (i.e. around the circumference or perimeter of the profile), could be angled with respect to the axis of the piece, circumferentially progressing along the length of the extrudate, or could be or sine-shaped. Fibers could be wrapped in a crossing angular relationship for progressive layers of the profile. Additionally, the number of filament strands provided in the non-parallel orientation could be adjusted as desired. Preferably, the non-parallel direction can have a directional component at least partially tangential to the flow direction "A."

It will also be appreciated that although the multi-stage crosshead die 18 is illustrated as a single piece with multiple individual stages 64, 66, 68, multiple individual dies may also be connected together to perform the same or similar functions of each of the described stages.

The disclosed system and method provide benefits of both extrusion and pultrusion processes, resulting in tight bonding between the reinforcements (filaments) and the substrate resin and thus providing a thermoplastic profile having excellent mechanical strength and durability. Thus, the resulting profile may have substantially improved screw and nail holding power, as well as superior resistance to cracking, splitting and filament separation, superior mechanical strength, in a lighter weight product having a lower filament loading percent. Good compatibility between the substrate resin (the second resin) and the cap resin (the third resin) also may enhance the bond between the substrate resin and cap stock, resulting in a more durable and aesthetically pleasing product.

Figure 8A:
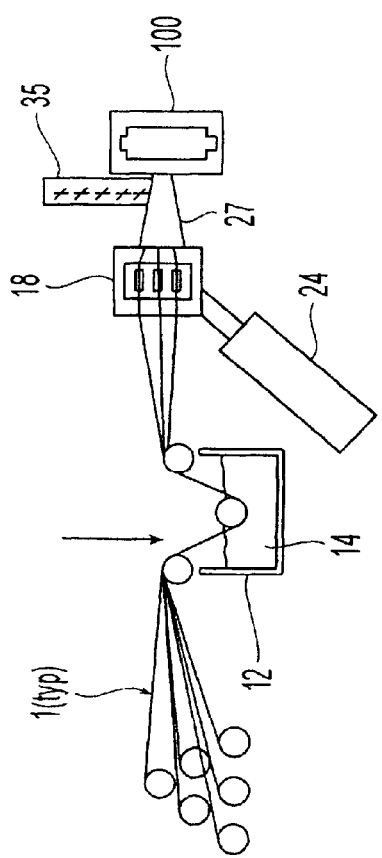
FIGS. 8A and 8B are schematic views of further embodiments of the process of FIG. 1, incorporating injection molding and compression molding steps.
Figure 8B:
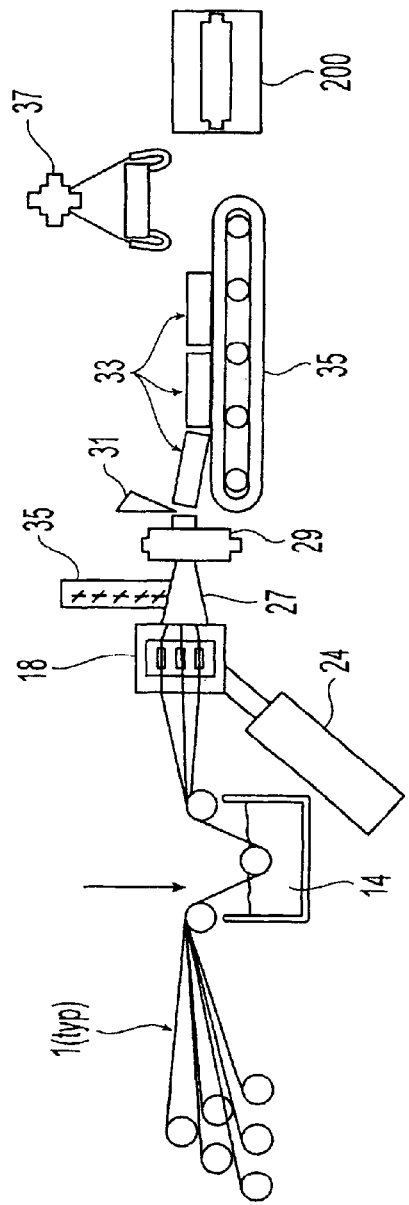

In other embodiments, shown in FIGS. 8A, 8B, the structural profile can be produced using a pultrusion/molding process, such as a pultrusion/injection molding process (FIG. 8A), or a pultrusion/compression molding process (FIG. 8B), as described separately as following, and pultrusion/resin transfer molding.

FIG. 8A illustrates an injection molding arrangement for use with the inventive system. The system shown in FIG. 8A is substantially the same as the system described in relation to FIG. 1, with all system elements up to and including the second stage of the crosshead die 18 being the same. The third stage of formation (that associated with the formation of the final profile shape), however, will occur within a mold 100. Thus, a transition zone 27 is provided between the die 18 and the mold 100. The temperature in the transition zone 27 should be maintained close to the gel temperature of the first resin 14 and below the solidification temperature of the second resin 22. Additionally, the residence time of the composite material within the transition zone 27 should be as short as possible to ensure that solidification does not occur prior to injection of the material into the mold 100. Thus, the entire melt (including filaments, and first and second resins 14, 22) will be injected into the mold 100 under the pressure provided by the extruder 24. The shape of the mold 100 may be selected, as desired, to produce products for specific applications, such as siding panels, fence picket parts, end caps, joints, hinges, trim boards for interior and exterior decoration, synthetic roofing shingles, slates, shakes or panels, etc.

After the material is molded in the mold 100, the temperature of the mold 100 may be maintained at or above the solidification temperature of the second resin 22 for a desired time period to allow for sufficient curing or solidification of the first plastisol resin, or to allow sufficient time for bonding between the filament 1 and the first resin 14, and between the first resin 14 and second resin 22. The temperature may then be decreased to the solidification temperature of the second resin 22 using a cooling system (not shown). The molded product will be solidified by bringing it to a temperature below that of the melting temperature of the second resin 22. The product will then be de-molded, the mold 100 will be closed, and a new molding cycle will occur. The cycle time for each molding process may be adjusted to suit the resins used, to achieve sufficient bonding, and to enhance overall process productivity.

The mold 100 may be a single cavity or multi-cavity mold. The number of the cavities may be determined by the resin used, the cycle time, and the output rate desired. The transition zone 27 of the die may be an injector where the first resin wetted filament and the second resin are continuously injected and accumulated in the barrel of the injector. When the cycle time is reached and the barrel is full for discharge, a piston may be used to inject the material to the mold cavity. The time inside the injector may be controlled and optimized so that the first resin 14 is not pre-solidified. As previously noted, the forward movement of the material is not generated by the combination of extrusion and pulling, as would be the case with a pultrusion apparatus, but is generated solely by the extrusion of the second resin 22 into the transition zone 27.

FIG. 8B illustrates a compression molding arrangement for use with the inventive system. The system shown in FIG. 8B is substantially the same as the system described in relation to FIG. 1, with all system elements up to and including the second stage of the crosshead die 18 being the same. As with the injection molding arrangement (FIG. 8A), the third stage of formation (that associated with the formation of the final profile shape) will occur within a mold 200. Thus, the temperature in the transition zone 27 should be lower than the gel temperature (or below the solidification temperature) of the first resin 14 (in the case of a plastisol resin system). Additionally, the residence time of the material within the transition zone 27 should be as short as possible to ensure that solidification does not occur prior to introduction of the material into the mold 200. The melt will be extruded out of the sheet die 29 and will be then cut using a cutting blade 31 to a desired size. The resulting cut pieces 33 may then be transferred away from the die 29 by a belt 35 and transported to a mold, for example, by being picked up by an automated robot arm 37, and placed into a compression mold 200. The shape of the compression mold may be selected, as desired, to produce products for specific applications. Such applications may include, siding panels, fence picket parts, end caps, joints, hinges, trim board for interior and exterior decoration, synthetic roofing shingles, slates, shakes or panels, etc.

After the material is molded in the mold 200, the temperature of the mold 200 may be maintained at or above the solidification temperature of the second resin 22 for a desired time period to allow for sufficient curing or solidification of the first plastisol resin, or to allow sufficient time for bonding between the filament 1 and the first resin 14, and between the first resin 14 and second resin 22. The temperature may then be decreased to the solidification temperature of the second resin 22 using a cooling system (not shown). The molded product will be solidified by bringing it to a temperature below that of the melting temperature of the second resin 22. The product will then be de-molded, the mold 200 will be closed, and a new molding cycle will occur. The cycle time for each molding process may be adjusted to suit the resins used, to achieve sufficient bonding, and to enhance overall process productivity. The mold 200 may be a single cavity or multi-cavity mold. The number of the cavities may be determined by the resin used, the cycle time, and the output rate desired.

A specific compression molding arrangement is disclosed in copending U.S. patent Ser. No. 11/227,009 to MacKinnon et al., titled "Process of and Apparatus for Making a Shingle, and Shingle Made Thereby", the entire contents of which application is incorporated by reference herein.

As with the injection molding arrangement, forward movement of the composite is not generated by the combination of extrusion and pulling (as it is in the previously-described pultrusion/co-extrusion embodiments, but instead purely generated by the extrusion of the second resin 22 into the sheet die 29.

Structural profiles produced using the disclosed method and apparatus may have any of a variety of cross-sectional shapes, such as round, square, rectangular, with reinforced beam, etc. These profiles may be useful for building and construction applications, including siding, roofing, fence, decking, window profiles, pipe, post, and for structural applications, including railing on bridges, light posts, highway signage, roadside marker posts, etc. Further, the profiles produced using the described process may have substantially higher strength as compared to current filament reinforced pultrusion and extrusion processes, so that the thicknesses of the profiles may be minimized, and the need for additional reinforcement (e.g. ribs, reinforcing rods, etc.) may be minimized or eliminated. For example, the modulus of elasticity of the profile products produced using the disclosed system and method may be at least 2,000 kpsi, preferably 2,500 kpsi, and most preferably 3,000 kpsi.

The disclosed system provides substantial benefit over conventional systems and methods for thermoplastics pultrusion because it provides for fast wet-out of filaments (using the filament pre-wetting arrangement described in relation to FIGS. 3A-3E). This is an advantage over conventional thermoplastics pultrusion techniques in which filaments are wetted with molten thermoplastic materials, which may be of high viscosity and thus may not allow wetting at the higher rates provided by the disclosed system. Additionally, the disclosed system and method provide for final shaping and sizing to occur outside the crosshead die 18, which minimizes the chance for damage to the die and/or extrudate.

Materials suitable for use as the first resin 14 include PVC plastisol, polyester plastisol, styrenic plastisol, high melt flow index polyolefins, etc. Examples of suitable high melt flow index polymers include polyolefins and acid containing olefin copolymers having a high melt flow index, polyurethanes, and acrylic acid copolymers. Materials suitable for use as the second and third resins 22, 34 include polyolefins such as HDPE, LDPE, LLDPE, UMWHDPE, polypropylene homopolymers and copolymers, impact modified polystyrene, Acrylonitrile Butadiene Styrene (ABS), polyamine, polyesters, polycarbonate, PVC (polyvinyl chloride), acrylic-styrene-acrylonitrile (ASA), PMA, PMMA, PEA, PEMA, PBA, PBMA, EVA, PVA, EVOH, maleic anhydride modified polyethylenes), maleic anhydride) modified polypropylenes, ionomerized acid containing polymers, and combinations or mixtures thereof.

The first and second extruders 24, 35, used for extruding the second and third resins 22, 34 respectively, can be single screw extruders, co-rotating twin screw extruders, or counter rotating twin screw extruders. The screws for the twin screw extruders can be designed to be intermeshing, non-intermeshing, according to the resin used. Additionally, the first extruder may deliver to the die 18 a combination of the first resin 22 and a suitable filament-reinforcing material, which may provide additional strength to the produced profile. The filaments added to the second resin 22 within the first extruder 24 may comprise continuous filaments, long filaments, or chopped filaments, as desired. Additionally, fillers may be used, such as $CaCO_3$, talc, wollastanite, mica, clay, fly ash, volcanic ash, slate dust, wood flours, flax, rice hulls, cork, kenaf, or combinations and mixtures thereof. The extruders 24, 35 may have heating or cooling elements to ensure that the extruded resin flows smoothly through the extruder and through the die 18.

Suitable materials for filaments 1 include A-glass, B-glass, C-glass. D-glass, E-glass filament, S-glass filament, carbon filament, steel filament, polyolefin filaments including HDPE, LDPE, UMWHDPE, LLDPE filament, polypropylene (PP) filaments, Aramid filaments, polyester filaments, and combinations thereof. Furthermore, invention is not limited to the use of filaments or bundles, and thus flat forms of reinforcement such as scrim, mats, felt, etc., are also contemplated for use. Where flat forms are used, the filament channels 16 may be sized as appropriate to accommodate such shapes.

Appropriate additives for the first, second and third resins 14, 22, 34 include thermal stabilizers, UV absorbers, UV stabilizers, hindered amine light stabilizers (HALS), antioxidants, pigments, colorants, dyes, color concentrates, processing aids, plasticizers, anti-statics, nucleating agents, anti-blocking agents, and mixtures or combinations thereof.

EXAMPLE

A PVC-Glass fiber/PVC Plastisol-Acrylic cap stock profile extrusion was carried out using a 3.5" Davis Standard single screw extruder as a main extruder for PVC substrate extrusion, a three stage 0.705"×0.705" crosshead die, with a square hole in the center, a 1.5" Polytruder single screw extruder, a vacuum calibration system, a fiber creel, and a plastisol resin bath. The substrate resin (second resin 22) was a rigid PVC material having a composition as shown in the table below.

| Material | | Parts by weight | Source of material |
|---|---|---|---|
| OxyVinyls 216 | Polyvinyl chloride | 100.00 | OxyVinyls, Dallas, TX |
| Mark 1900 | Stabilizer | 1.50 | Chemtura Corporation, Middlebury, CT |
| Kronos 2073 | Titanium dioxide | 1.00 | Kronos, Inc., Cranbury, NJ |
| Rheolub 250 | Lubricant | 0.90 | Honeywell, Morristown, NJ |
| AC 629 A | Lubricant | 0.15 | Honeywell, Morristown, NJ |
| Loxiol G60 | Lubricant | 0.50 | Cognis, Ambler, PA |
| Ca St | Calcium stearate | 0.50 | |
| Paraloid K 400 | Flow aid | 6.50 | Rohm and Haas, Spring House, PA |
| Omyacarb UFT | Calcium carbonate | 3.00 | Omya Inc., Alpharetta, Georgia |
| TOTAL phr | | 114.05 | |

The glass fiber was grade 673 from Vetrotex; the cap stock (third resin 34) was Solarkote from Arkema, Inc.; the plastisol resin (the first resin 14) was Structural Engineered Plastisol (SEP) resin product number Z0423B03 RDP-00016 available from Rutland Plastic Technologies, 10021 Rodney Street, Pineville, N.C. 28134. Eight strands of glass fiber were first fed into eight separate channels of the die without contacting the plastisol resin, and pulled through the crosshead die and calibrator using a puller. The PVC substrate was then extruded through the crosshead die, and when the resin extruded out of the die and calibrator, the profile along with the glass fiber was pulled through the cooling tank and puller, and cutting saw. When the process was stable, the middle holly board was slid into the bath where the SEP resin submerged the glass fiber. The profile then was extruded with glass fiber and SEP resin and the PVC matrix substrate. The profile was calibrated, cooled and cut to length for sample collection and testing. The samples were collected at different speeds, with and without SPE resin, and with and without cap stock. The samples were then tested for the stiffness, strength, elongation, screw holding power, and coefficient of linear thermal expansion (CLTE).

Table 1 lists maximum strength and displacement at yield for the whole part (profile) tested using a three point bending test. The three point bending tests were conducted using an Instron machine model 4400R, following ASTM D790. Tests were conducted at room temperature and 50% relative humidity. The span for the fixture was set at 6 inches, and cross-head speed was fixed at 0.085 in/minute.

| Samples | Max Load [lbf] | Displ at Yield [in] |
|---|---|---|
| 5.86% glass fiber (GF), 6.8 feet per minute (fpm), no cap | 484 | 0.4889 |
| 5.59% GF, 5.1 fpm, no cap | 567 | 0.4054 |
| 5.99% GF, 3.4 fpm, no cap | 626 | 0.448 |
| 5.62% GF, 13.6 fpm, no cap | 474 | 0.4372 |
| 5.44% GF, 13.6 fpm, Tdie = 370° F., no cap | 443 | 0.4507 |
| 4.39% GF, 6.8 fpm, with cap | 605 | 0.3544 |
| 0% GF, 6.8 fpm, with cap | 284 | 0.4515 |
| Conventional Profile, 55% GF | 326 | 0.1073 |

Table 2 lists modulus of elasticity, displacement at yield, and strength at yield for the milled test bars using a three point bending test. The three point bending tests were conducted at the same conditions as described above in regards to Table 1, following ASTM D790. The samples were cut from produced picket samples into rectangular bars having dimensions of approximately 0.7×0.125×6 inches. The span for the test fixture was calculated at sixteen times the depth of the sample, resulting in approximately 2 inches.

| Samples | MOE [kpsi] | Stress at Yield [kpsi] | Displ at Yield [in] |
|---|---|---|---|
| 5.86% glass fiber (GF), 6.8 feet per minute (fpm), no cap | 402 | 9.5 | 0.438 |
| 5.59% GF, 5.1 fpm, no cap | 453 | 11.1 | 0.474 |
| 4.39% GF, 6.8 fpm, with cap | 325 | 10.1 | 0.523 |
| 0% GF, 6.8 fpm, with cap | 280 | 7.3 | 0.469 |
| Conventional Profile, 55% GF | 1555 | 36.9 | 0.219 |

Table 3 lists the screw holding power. Screw holding power was tested on whole profile samples, approximately 6-inches in length, using an Instron machine model 4400R at room temperature. For each sample, a ⅛" diameter, 1¾" long sheet metal screw was installed in a hole predrilled in the center (lengthwise) of the sample. The sample was then gripped with a metal piece and the screw was pulled by the upper gripper of the Instron machine, until the screw was completely pulled out. The maximum load was then recorded.

| Samples | Screw Holding Power [lbf/in] |
|---|---|
| 5.86% glass fiber (GF), 6.8 feet per minute (fpm), no cap | 2465 |
| 5.59% GF, 5.1 fpm, no cap | 2167 |
| 5.99% GF, 3.4 fpm, no cap | 2104 |
| 5.62% GF, 13.6 fpm, no cap | 2161 |
| 5.44% GF, 13.6 fmp, Tdie = 370° F., no cap | 3167 |
| 4.39% GF, 6.8 fpm, with cap | 2621 |
| 0% GF, 6.8 fpm, with cap | 2833 |
| Conventional Profile, 55% GF | 675 |

Table 4 lists Coefficient of Linear Thermal Expansion (CLTE). CLTE tests were conducted using an Electronic Ball Deformeter manufactured by CEBTP company of France, to measure the thermal dilatation on a profile (length of about 8-inches) between two temperatures, 60° F. and 150° F. The average of the two CLTE values was then taken as the CLTE at an average temperature of 105° F.

| Samples | CLTE, ×10$^{-6}$ (degree F.)$^{-1}$ |
|---|---|
| E-glass, at 68° F. | 3 |
| Polypropylene, at 68° F. | 56 |
| PVC, at 68° F. | 47 |
| 4.39% glass fiber (GF), 6.8 feet per minute (fpm), with cap, at 105° F. | 15.9 |
| 0% GF, 6.8 fpm, with cap, at 105° F. | 24.6 |
| Conventional Profile, 55% GF, at 105° F. | 3 |

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

The invention claimed is:

1. A system for providing a reinforced thermoplastic structure, comprising:
   a resin wetting portion comprising a basin containing liquid plastisol, the resin wetting portion configured for impregnating a plurality of reinforcing filaments with the liquid plastisol;
   a die having (i) a first portion comprising a plurality of filament alignment channels for receiving the reinforcing filaments and the liquid plastisol in a wet and completely uncured state, (ii) a second portion for receiving a second resin, contacting the second resin with the reinforcing filaments, and at least partially solidifying the liquid plastisol and the second resins to form a reinforced thermoplastic structure; and (iii) a third portion for applying a third thermoplastic resin to an exterior surface of said reinforced thermoplastic structure; and
   wherein the second portion of the die comprises a curved flow channel,
   wherein respective distal ends of the plurality of filament alignment channels are positioned adjacent to the curved flow channel; and
   a cooling element positioned adjacent to proximal ends of the filament alignment channels for providing a cooling fluid flow adjacent to the proximal ends to maintain the liquid plastisol and the plurality of reinforcing filaments at a first temperature.

2. The system of claim 1, wherein the second portion of the die has an angled resin inlet for receiving the second resin at a resin input angle that is non-orthogonal to a longitudinal axis of the filament.

3. The system of claim 2, wherein the angled resin inlet forms an angle of about 30-degrees to about 40-degrees with respect to the longitudinal axes of the reinforcing filaments.

4. The system of claim 1, wherein the die has an outlet end adjacent the third portion, the distal end of a first one of the plurality of filament alignment channels is spaced a first distance from the outlet end of the die, the distal end of a second one of the plurality of filament alignment channels is spaced a second distance from the outlet end of the die, and wherein the first and second distances are unequal.

5. The system of claim 4, wherein the first and second distances are between about 0.5 inches and about 2 inches.

6. The system of claim 4, wherein the first and second distances are between about 1.5 inches and about 2 inches.

7. A system for providing a reinforced thermoplastic structure, comprising:
   a resin wetting element comprising a basin containing liquid plastisol, the resin wetting element configured for impregnating a plurality of reinforcing filaments with the liquid plastisol;
   a die having (i) a first portion comprising a plurality of filament alignment channels for receiving the reinforcing filaments and the liquid plastisol in a wet and completely uncured state, (ii) a second portion for receiving a second resin, contacting the second resin with the reinforcing filaments, and at least partially solidifying the plastisol and the second resin to form a reinforced thermoplastic structure having a predetermined outer shape; and (iii) a third portion for applying a third thermoplastic resin to an exterior surface of said reinforced thermoplastic structure;
   wherein the plurality of filament alignment channels are sized to allow forward movement of the filaments and the liquid plastisol to pass into said second portion of the die and to prevent reverse movement of the liquid plastisol and the second thermoplastic resin backwards through the filament alignment channels;
   wherein the second portion of the die has an angled resin inlet for receiving the second resin at a resin input angle that is non-orthogonal to a longitudinal axis of the filament; and
   a cooling element positioned adjacent to the proximal ends of the filament alignment channels for providing a cooling fluid flow adjacent to the proximal ends to maintain the liquid plastisol and the plurality of reinforcing filaments at a first temperature.

8. The system of claim 7, wherein the resin wetting element further comprises a resin bath configured to receive a quantity of said liquid plastisol therein in a liquid state, and a plurality of guide members for (i) receiving respective individual ones of the filaments, (ii) submerging the individual ones of the filaments in the liquid plastisol, and (iii) directing the individual ones of the filaments out of the resin bath to respective ones of the filament alignment channels of the die.

9. The system of claim 7, wherein the plurality of filament alignment channels direct the plurality of reinforcing filaments within the die.

10. The system of claim 9, wherein the resin wetting element comprises first, second and third guide boards having a plurality of filament receiving bores configured to receive and separate adjacent filaments of the plurality of filaments.

11. The system of claim 7, further comprising a profile die portion having an internal shape that substantially corresponds to a final outer shape of the reinforced thermoplastic structure, the profile die portion further having a resin inlet for receiving a third thermoplastic resin and directing the third thermoplastic resin onto an exterior surface of the reinforced thermoplastic structure.

12. The system of claim 7, wherein the resin input angle is about 30-degrees to about 40-degrees with respect to the longitudinal axis of each filament.

13. The system of claim 7, wherein the plurality of filament channels each has a proximal end for receiving each filament and a distal end positioned adjacent the second portion to allow the filaments to be contacted with the second thermoplastic resin.

14. The system of claim 13, wherein the distal end of each of the filament channels is positioned to provide each filament within the die at a predetermined location corresponding to a predetermined location within the reinforced thermoplastic structure.

15. The system of claim 7, wherein the plurality of filament alignment channels each has (i) a proximal end that extends a first distance away from a surface of the die, and (ii) a distal end that extends a second distance into the die.

16. The system of claim 13, wherein the plurality of filament alignment channels each has (i) a proximal end for receiving at least one of the plurality of reinforcing filaments, and (ii) a distal end that extends a second distance into the die; and wherein the second distance of at least one of the filament alignment channels is greater than the second distance of at least a second of the filament alignment channels.

17. The system of claim 7, further comprising first and second temperature controls associated with the first and second portions of the die, respectively, said first and second temperature controls being configured to maintain the first and second portions of the die within respective first and second predetermined temperature ranges.

18. The system of claim 17, wherein the first temperature range is less than about 250-degrees Fahrenheit (F), and the second temperature range is from about 350-degrees F. to about 380-degrees F., and wherein the first temperature corresponds to a liquid state of said liquid plastisol and the second temperature corresponds to a solidification state of the liquid plastisol and the second thermoplastic resins.

19. The system of claim 7, wherein the die further comprises an insulating layer disposed between the first and second portions, the insulating layer comprising a ceramic material.

20. The system of claim 7, wherein the die further comprises an insulating layer disposed between the first and second portions, the insulating layer comprising glass fiber material.

* * * * *